Figure 1:
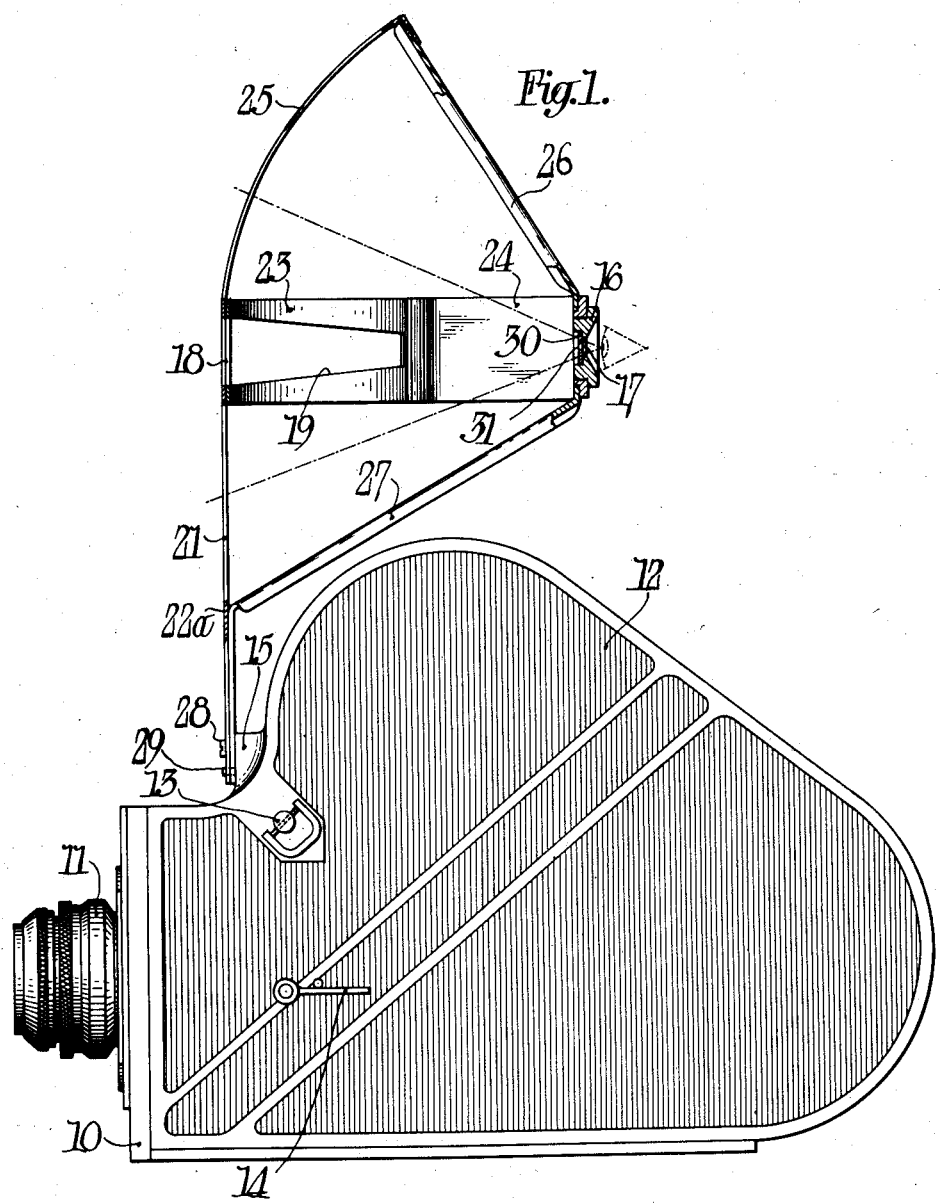

May 7, 1935.  J. L. BOON  2,000,577
DIRECT VIEW FINDER
Filed Nov. 15, 1933  3 Sheets-Sheet 1

Inventor:
Joseph L. Boon,
By

May 7, 1935.   J. L. BOON   2,000,577
DIRECT VIEW FINDER
Filed Nov. 15, 1933   3 Sheets-Sheet 2
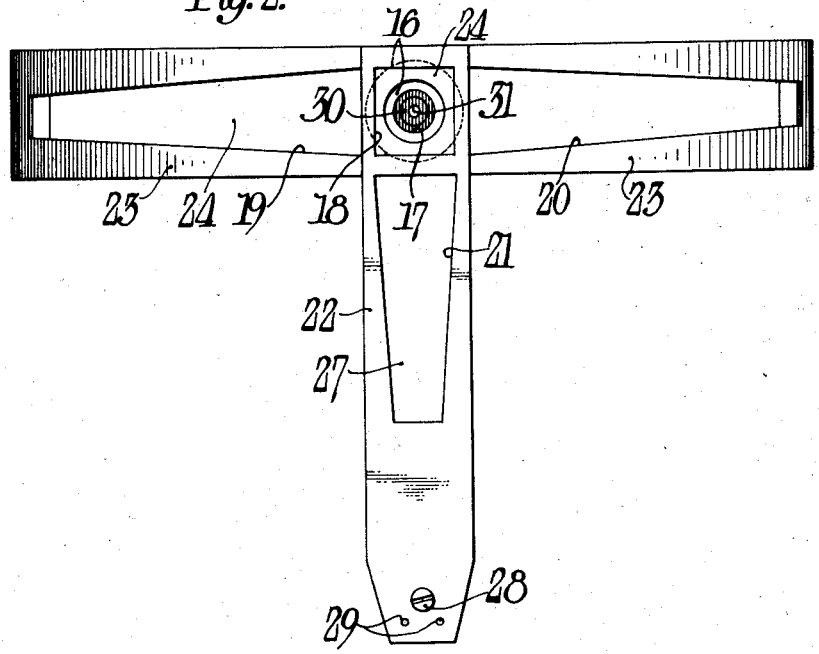
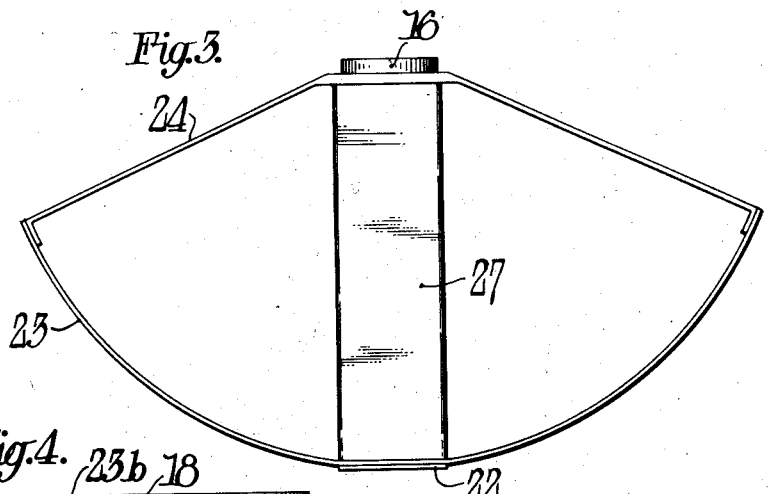
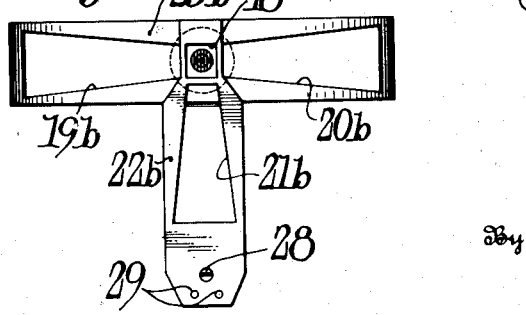
Inventor:
Joseph L. Boon, Patented May 7, 1935

2,000,577

UNITED STATES PATENT OFFICE 2,000,577

DIRECT VIEW FINDER

Joseph L. Boon, Rochester, N. Y., assignor to Eastman Kodak Company, Rochester, N. Y., a corporation of New York Application November 15, 1933, Serial No. 698,113

11 Claims. (Cl. 33—64)

The present invention relates to a finder for sighting an instrument having a definite field and more particularly to a finder through which fast moving objects may be observed during movement with respect to said definite field.

It is extremely difficult to direct an instrument so that a fast moving object will move through the field of that instrument and especially so that the object will move through the appropriate part of the instrument field.

The primary object of the present invention is the provision of a finder for attachment to an instrument having a definite field, which finder permits observation of the moving object while outside of the instrument field and which enables the operator to direct the instrument while the object is outside of the instrument field so that the path of the object will be through said instrument field.

Another object of the invention is the provision of a finder for observing horizontally and/or vertically fast moving objects during approach to the instrument field.

A further object of the invention is the provision of a finder having a front sight which is provided with an opening and with an elongated slot for observing the object during movement outside of the instrument field, said slot being tapered to converge in a direction away from said opening and present a more restricted finder field for the observation of more distant objects moving in a path perpendicular to the axis of the instrument or tapered to diverge in a direction away from said opening and present a larger field for the observation of more distant objects.

Still another object of the invention is the provision of a finder having a front sight and a rear sight which increases the field of the finder and which includes a colored filter provided with a hole, the annular colored filter permitting observation through the finder of a larger field while the hole in the filter defines the definite field of the instrument.

A still further object of the invention is the provision of a finder having the sights for defining the instrument field at each end of a casing or tube, the walls of said casing or tube being provided with openings through which objects outside of the instrument field may be observed.

The above and other objects of the invention are embodied in a finder having the usual sights for defining the definite field of the instrument, said finder being provided with one or more additional openings in predetermined relation to the usual sights of the finder and through which may be observed the location and path of a fast moving object with respect to the instrument field. According to the invention the additional openings may be provided in the front sight of the finder or in the walls of the casing of the finder.

Since more distant objects moving in a path perpendicular to the axis of the instrument subtend a smaller angle at the instrument, it may be desirable proportionally to restrict the portion of the additional opening through which the more distant objects are observed. Consequently the additional opening is preferably tapered to converge in a direction away from the usual opening of the front sight.

On the other hand it is difficult initially to sight distant objects through a finder and this condition may render desirable enlargement of the portions of said elongated slot through which distant objects are observed. Hence the additional opening may be tapered to diverge in a direction away from the usual opening of the front sight. With this type of finder the instrument must be moved so that after the original sighting the object is observed as midway between the tapered edges of the additional opening.

The finder of the present invention is of the well known direct view type and while certain direct view finders of the prior art permit observation of an object outside of the instrument field such finders do not permit or make provision for judging the location or path of the object with respect to the instrument field.

The finder according to the invention will function with equal success on many instruments having a definite field but for purposes of illustration and demonstration the finder is to be described with respect to an instrument having an optical system, such as a photographic camera, and particularly with respect to a high speed motion picture camera as used in timing air races.

Figure 5:
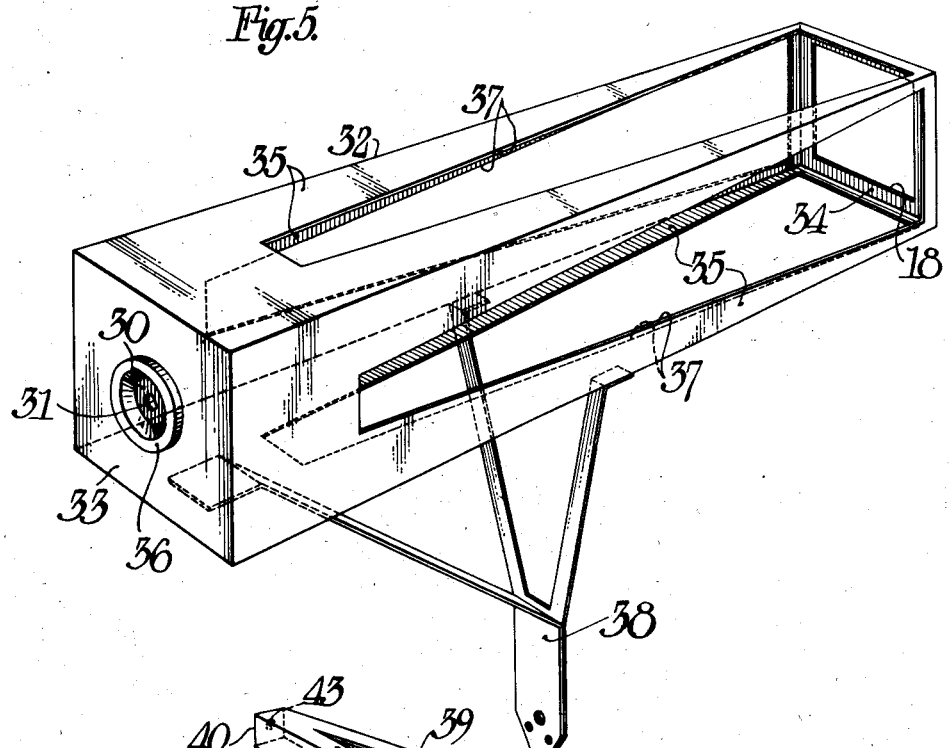
Figure 6:
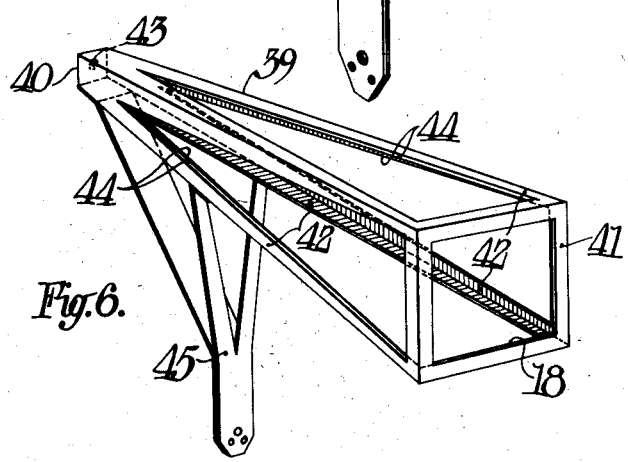

Reference is hereby made to the accompanying drawings in which similar reference characters designate similar elements and in which:

Fig. 1 is a side elevation of a motion picture camera and a partial vertical cross-section of one form of finder with the additional openings in the front sight; Fig. 2 is a front view of the preferred form of finder with the additional openings in the front sight; Fig. 3 is a plan view of the finder illustrated in Fig. 2; Fig. 4 is a front view to reduced scale of a modified form of front sight which is provided with additional openings according to the invention; Fig. 5 is a perspective view of a finder composed of a casing which is provided with additional openings; and Fig. 6 is a perspective view of a finder composed of a converging tube which has the walls thereof provided with said additional openings.

Referring to Fig. 1, the camera 10, which is preferably of the high speed motion picture type, has an objective 11, has a cover 12 which is fastened to the camera 10 by a lock 13 and which carries a lever 14, and has a supporting lug 15.

The preferred form of the finder with additional openings in the front sight is shown in Figs. 2 and 3 and consists of a rear sight 16 which is provided with an opening 17 and of a front sight which is provided with an opening 18 and with additional openings 19, 20 and 21. The front sight may consist of a strip 22 which is provided with the openings 18 and 21 and of a band 23 which is provided with openings 18, 19 and 20. A brace 24 is fastened at each end to the ends of band 23 and supports the rear sight 16. The opening 18 in strip 22 and band 23 coincide and form together with the opening 17 in the rear sight 16 a conventional form of direct view finder.

If the finder is to be used for sighting falling objects, the front sight of the finder may be constructed as shown in Fig. 1 and may include a strip 22a which extends in arcuate formation above the opening 18 of the front sight. The strip 22a is provided, as in Figs. 2 and 3, with opening 18 and with additional opening 21, and with still another additional opening 25. A strut 26 is fastened between one end of strip 22a and the center of brace 24.

The finder may be supported on the associated instrument in proper relation to the axis of the instrument, one type of mounting being illustrated in Fig. 1 by way of example. A bracket 27 is fastened at one end to the center of brace 24 and at the other end by a bolt 28 which also passes through strip 22a and which is threaded into supporting lug 15. A pair of locating pins 29 extend through strip 22a, bracket 27 and into supporting lug 15. As illustrated in Fig. 1 the finder according to the invention is supported with the band 23 of the front sight spaced from and extending transversely of the optical axis of objective 11. Furthermore the additional openings 19, 20 and 21 are shown in Fig. 2 to be located in quadrature, which is also true of the additional opening 25 of Fig. 1.

A transparent colored filter 30 is mounted in the opening 17 of rear sight 16 and is provided with a hole 31 which is annularly spaced from the rim of opening 17.

The operation of the finder according to the invention will now be described with particular reference to use on a high speed motion picture camera which is being used to time air races. As an incident to a determination of the speed of an airplane, the plane is photographed with a high speed motion picture camera as it passes a pole. Accordingly, the camera is set up with said pole near or at the center of the camera field.

It is common practice for the airplane at the start of the race to execute a power dive and to level off as the plane passes the pole. The camera operator and even the aviator cannot determine the altitude at which the plane will be levelled off or pass the pole, so that it is extremely difficult to direct the camera at the proper elevation as the plane passes the pole.

The task of the camera operator is greatly facilitated by equipping the camera with the finder of the present invention. As the plane approaches the pole toward which the camera is directed, the operator may observe the plane through one of the additional openings 19 or 20, or else elevate the camera 10 so that the plane can be sighted through either of additional openings 19 or 20. If the plane is executing a power dive, the operator changes the elevation of the camera so that the plane continues to be sighted through said additional opening. The relation of the additional opening is such that if the camera is moved to maintain the sight on the plane, then the plane will pass through the photographic field of the camera.

In most instances the fast moving object such as an airplane is moving in a direction approximately perpendicular to the axis of the instrument. Consequently the object when first viewed through the extreme ends of the additional openings 19, 20, 21 and 25 is a considerable distance away and subtends a comparatively smaller angle at the eye of the operator than when said object is in or near the field of the instrument. Therefore, in the preferred form of the invention, the edges of the openings 19, 20, 21 and 25 are tapered to converge in a direction away from the usual opening 18 of the front sight so that the object when more distant is viewed through a narrower portion of the additional opening. In order to increase the range of the finder according to the invention, additional openings 19, 20, 21 and 25 are elongated and have their longer dimensions extending away from or longitudinally of the opening 18. The longer edges of the additional openings 19, 20, 21 and 25 are tapered with respect to each other and theoretically the spacing of these edges should vary as the cosine of the angle subtended by the eye varies while viewing an object moving in the path which is perpendicular to the axis of the instrument. In practice, however, the theoretical cosine curves of these edges are approximated by straight line edges which have slopes corresponding to the slopes of the cosine curves. In one disclosed form of the invention, the front sight is provided with a square opening 18 and is provided with a plurality of elongated tapering additional openings 19, 20 and 21 which are elongated longitudinally of opening 18 and which are tapered to converge in a direction away from opening 18. The additional openings 19, 20, 21 and 25 of the form illustrated in Fig. 1 are symmetrical to axes which are 90 degrees from each other or in quadrature, and this is true in a limited sense of the openings 19, 20 and 21 of the preferred form of Figs. 2 and 3.

The instrument operator will be considerably aided in sighting a fast moving object for the first time and during rapid changes in position of the object by the provision in the rear sight opening 17 of the transparent colored filter 30 which is provided with the centrally located hole 31. The diameter of hole 31 is such that the definite field of the instrument may be observed through hole 31 and opening 18. The annular transparent ring of the filter 30 in effect enlarges the rear sight opening since the object may be viewed through said filter 30 and the additional openings 21 and 25 as indicated by the dot-dash lines of Fig. 1 and also through additional openings 19 and 20. However, when the light rays from the object pass through the filter 30 the object will appear to be colored and the operator is notified that observation is taking place through the filter 30.

An alternative construction of the front sight which will facilitate the original sighting of the object is shown in Fig. 4. In this modification, the front sight includes a strip 22b which is provided with the usual opening 18 and with an additional opening 21b, and includes a band 23b which is preferably of arcuate formation and which is provided with additional openings 19b and 20b. Contrary to the preferred form of the finder, the additional openings 19b, 20b and 21b are tapered to diverge in a direction away from the opening 18 and thus a large finder field is presented for the initial sighting of the object. With this form of the finder the operator must exercise care always to move the instrument so that the objects appear midway between the tapering edges of the additional openings 19b, 20b and 21b. Such a finder has an advantage in common with the provision of the colored filter 30 in the rear sight 16 and is used in conjunction with a rear sight which may or may not be provided with such a filter.

More compact embodiments of the invention are shown in Figs. 5 and 6. In each of these forms, the finder has the usual front and rear sights provided in the respective ends of a casing while the additional openings for observing the object during movements outside of the instrument field are provided in the side walls of said casing.

Referring to Fig. 5, the casing 32 is elongated and rectangular in form and has a rear end 33, a front end 34, and a plurality of side walls 35. A colored filter 30 may be supported by a ring 36 on the rear end 33 and may be provided with a hole 31 to form the rear sight of the finder. An opening 18 may be provided in the front end 34 to form the front sight of the finder. Additional openings 37 are provided respectively in the side walls 35 of casing 32 and are preferably elongated and converge in a direction away from the usual opening 18 of the front sight. A bracket 38 is fastened to the under side of casing 32 and may be attached to the supporting lug 15 of the camera 10.

As shown in Fig. 6, the finder may be composed of a casing 39 which has the outline of a regular pyramid and which has a rear end 40, a front end 41, and sides 42. The rear end 40 is provided with a hole 43 to form the rear sight of the finder and the front end 41 is provided with the usual opening 18 to form the front sight of the finder. Additional openings 44 are provided in respective side walls 42 and preferably converge to a point and in a direction away from the usual opening 18 of the front sight. A bracket 45 is attached at one end to the casing 39 and at the other end to the supporting lug 15 for the purpose of locating the finder with respect to the camera 10.

Since many other embodiments of the invention may be apparent to those skilled in the art, the present disclosure is to be construed in an illustrative and not in a limiting sense.

Having now particularly described my invention what I desire to secure by Letters Patent of the United States and what I claim is:—

1. A finder for observing a moving object and for attachment to an instrument having an optical system with a definite field, comprising a rear sight provided with an opening, and a front sight provided with one opening which together with the opening in said rear sight define the definite field of the instrument, said finder also being provided with an additional opening displaced from and in predetermined relation to the opening in said front sight and which together with the opening in said rear sight defines a field extraneous but in known relation to the field of the instrument.

2. A finder for observing moving objects and for attachment to an instrument having a definite field, comprising a front sight provided with an opening for defining the field of said instrument and provided with an additional opening which is in predetermined relation to the first mentioned opening and which is tapered with respect to a plane through the center of said first mentioned opening.

3. A finder for observing moving objects and for attachment to an instrument having a definite field, comprising a front sight provided with an opening for defining the field of said instrument and provided with an additional opening which is in predetermined relation to the first mentioned opening and which is tapered symmetrically with respect to a plane through the center of said first mentioned opening.

4. A finder for observing moving objects and for attachment to an instrument having a definite field, comprising a front sight provided with an opening for defining the field of said instrument and provided with an additional opening which is in predetermined relation to the first mentioned opening and which is tapered to converge with respect to a plane through said first mentioned opening.

5. A finder for observing moving objects and for attachment to an instrument having a definite field, comprising a front sight provided with an opening for defining the field of said instrument and provided with an additional opening which is in predetermined relation to the first mentioned opening and which is tapered to diverge in a direction away from said first mentioned opening.

6. A finder for observing moving objects and for attachment to an instrument having a definite field, comprising a rear sight and an arcuate front sight which is provided with an opening for defining the field of said instrument and which is provided with a second opening in predetermined relation to the first mentioned opening for observation of said objects during movement outside of but in known relation to the field of said instrument.

7. A finder for observing moving objects and for attachment to an instrument having a definite field, comprising a rear sight and an arcuate front sight which is concave with respect to said rear sight, which is provided with an opening for defining the field of said instrument and which is provided with an additional opening in predetermined relation to the first mentioned opening, elongated longitudinally of and tapered with respect to a plane through said first mentioned opening.

8. A finder for observing moving objects and for attachment to an instrument having a definite field, comprising a rear sight provided with an opening, and an arcuate front sight with a center of curvature at said rear sight, being provided with one opening through which together with the opening in said rear sight the definite field of the instrument may be observed, and said finder being provided with another opening in predetermined relation to said one opening and through which together with the opening of the rear sight may be observed a field extraneous to but in known relation to the field of said instrument.

9. A finder for observing moving objects and for attachment to an instrument having a definite field, comprising a sight which is provided with an opening for defining the field of said instrument and which is provided with a plurality of openings which are located in quadrature and in predetermined relation to the first mentioned opening and through which the object can be observed during movements outside of but in known relation to the field of said instrument.

10. In a finder for observing a moving object and for attachment to an instrument having a definite field, the combination with a rear sight provided with an opening, and a front sight provided with an opening, the openings in said sights defining a field greater than the field of said instrument, of a transparent colored filter mounted in the opening of one of said sights and also provided with an opening which, together with the opening in the other sight defines the definite field of the instrument, said filter coloring that portion of the greater field as viewed through the first mentioned openings of said sights which is extraneous to the definite field of the instrument.

11. In a finder for observing a moving object and for attachment to an instrument having a definite field, the combination with a rear sight provided with an opening, and a front sight provided with an opening for defining in cooperation with said rear sight the field of said instrument, said finder being provided with a second opening displaced from the first mentioned opening in said front sight and through which movement of the object outside of the instrument field may be viewed through said rear sight, of a transparent colored filter which is provided with a hole and mounted in the opening of said rear sight, permitting through the first mentioned opening in said front sight and through the hole in said filter a clear view of the field of the instrument and for coloring at least part of the field so viewed through the second mentioned opening of the front sight.

JOSEPH L. BOON.